June 26, 1934.  E. E. DRAPER  1,964,622
DIRECTION FINDER FOR STEREOSCOPIC CAMERAS
Filed April 24, 1931
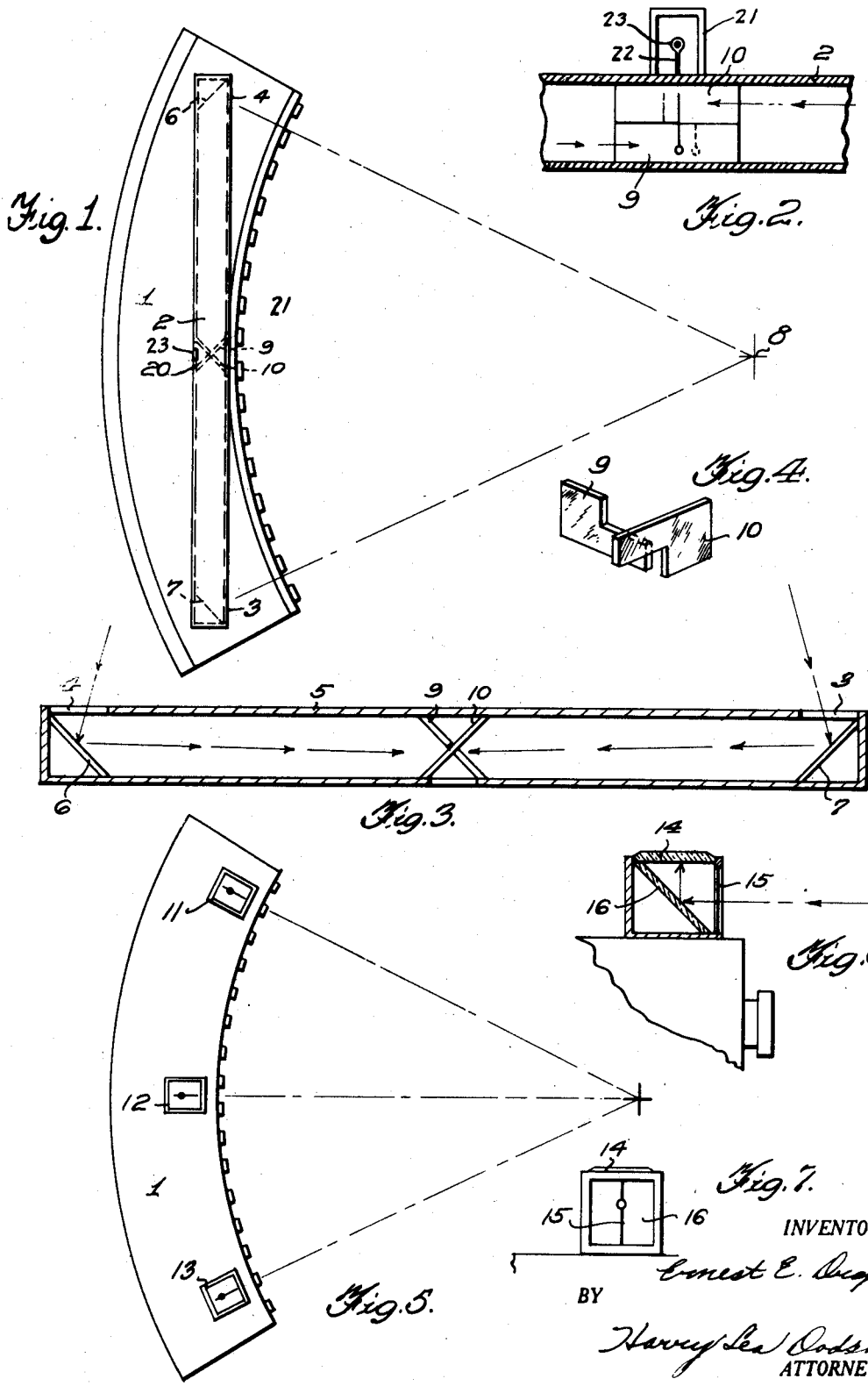
INVENTOR.
Ernest E. Draper
BY
Harvey Lea Dodson
ATTORNEY.

Patented June 26, 1934

1,964,622

UNITED STATES PATENT OFFICE 1,964,622

DIRECTION FINDER FOR STEREOSCOPIC CAMERAS

Ernest E. Draper, Scarsdale, N. Y., assignor to The Perser Corporation, New York, N. Y., a corporation of New York Application April 24, 1931, Serial No. 532,524

2 Claims. (Cl. 88—1.5)

My invention relates to that class of cameras which are described in my copending application Serial No. 532,523 in which a multiplicity of cameras having matched lenses of equal focal length are arranged in the arc of a circle about the object to be photographed. Inasmuch as the negatives developed from the plates exposed in the cameras must be projected onto a sensitized plate located behind a line screen, consisting of alternate vertical opaque and transparent lines, in order to make a composite positive which will present a true stereoscopic picture, it is essential that the cameras be level and horizontal and some suitable form of range finder must be provided in order to ensure the cameras pointing to the center of the arc. I have found it desirable to so connect the cameras that they are virtually one case. This greatly shortens the time required for leveling and centering the case of cameras.

My invention has for its object to construct a finder which will enable the operator by visable inspection to ascertain with certainty that the camera is in the correct position for satisfactory operation.

My invention has for its further object to provide a direct view finder so that if desired the object being photographed can be observed before and up to the exposure.

My means of accomplishing the foregoing objects may be more readily understood by having reference to the accompanying drawing in which—

Fig. 1 is a top or plan view of a camera equipped with my improvement;

Fig. 2 is a fragmentary detail view in section at the center of the finder;

Fig. 3 is a cross section of the finder showing the location of the mirrors;

Fig. 4 is a detail view of the mirrors for the center;

Fig. 5 shows a form of direct view finder;

Fig. 6 shows a sectional view of the same; and

Fig. 7 is a front view of the same.

Similar reference numerals refer to similar parts throughout the entire description.

As shown in the drawing the camera 1 has mounted upon its top a tube 2 which is provided with openings 3 and 4 at each end in the front wall 5. Behind each of the openings 3 and 4 I locate mirrors 6 and 7. These mirrors are mounted at such an angle that if a plumb line (not shown) were to be suspended about the center 8 of the arc its reflections on the two mirrors 6 and 7 will be thrown onto two other mirrors 9 and 10 located in the center of the tube 1. These mirrors are mounted opposite an opening 20 cut in the rear wall of the tube 2. The mirrors 9 and 10 are cut as shown in Fig. 4 and mounted at an angle so that one will reflect back to the eye of the observer or operator of the camera the picture or reflection disclosed on the mirror 3 at one end of the tube 2 while the other will show the reflections shown in the mirror 4 at the other end of the tube 2. These mirrors are set permanently in the tube 2 which is permanently secured to the camera 1 and are so located as to their respective angles that when a plumb line (not shown) is at the center of the arc the reflections in the two mirrors 9 and 10 in the center of the tube 2 will match to make one line as clearly seen in Fig. 2. Should the camera 1 be moved forward or backward or be pointed to the right or left the line will separate in two parts as shown by the dotted lines in Fig. 2. If the camera 1 is tilted from the horizontal the line will be in two parts but each will be at an angle. It will be obvious that if properly constructed this finder intended primarily to locate the center of the arc may also be used to view the subject before exposing the plates in the camera. It may be found desirable to construct a direct view finder by the use of which the operator may observe the subject being photographed up to the time of exposure. A simple form for this purpose is illustrated in Figs. 5 to 7 inclusive. This form consists of three cases, 11, 12 and 13 which are mounted at the end, center and end respectively of the camera 1. As each one is identical in structure I shall confine my description to a single one. The case 11 which is permanently attached to the camera 1 is provided with windows or openings 14 and 15 in the top and front of the case. A mirror 16 is mounted inside the case 11 at such an angle that it will reflect the plumb line (not shown) and also an image or images of whatever is within the range of the lens of the camera 1. By scribing a representation of the plumb line on the mirror 16 it is possible to use this form of direct finder to locate the center of the arc with great accuracy.

In some cases it may be found desirable to construct the direct view finder by means of a simple rectangular frame being mounted upon the forward edge of the tube 2 at its center and then mounting the rod 22 at the rear of the tube 2. As clearly seen in Fig. 1, this rod has an observation hole 23 formed at its top. By looking through this observation opening or peep hole all of the area comprehended within the rectangle 21 will correspond to the available area of the plate or film used in the camera.

Having described my invention what I regard as new and desire to secure by Letters Patent is:

1. The combination, with a camera, having a multiplicity of lenses arranged in the arc of a circle about the object to be photographed, of a tube affixed to the top of said camera, there being openings in the front of said tube adjacent its ends, a mirror mounted in each end of said tube, its angle being such that it will reflect an image of a plumb line suspended above the center of said arc, a pair of mirrors mounted in the center of said tube opposite an opening in the rear wall of said tube at such an angle that the reflections of said plumb line from the end mirrors will coincide forming a single line.

2. The combination with a camera, having a multiplicity of lenses arranged in the arc of a circle about the object to be photographed, of a tube affixed to said camera, there being openings in the front of said tube adjacent to its ends, means mounted in said tube to reflect rays of light received through said openings from a vertical line located at the center of said arc, to the eyes of the observer as coinciding images of the vertical line.

ERNEST E. DRAPER.